(12) United States Patent
Mata et al.

(10) Patent No.: US 8,469,294 B2
(45) Date of Patent: Jun. 25, 2013

(54) CONTINUOUS MOLDED EMITTER

(75) Inventors: John D. Mata, San Diego, CA (US);
William C. Taylor, Jr., El Cajon, CA (US); Jeffrey A. Vildibill, Poway, CA (US)

(73) Assignee: The Toro Company, Bloomington, MN (US)

( * ) Notice: Subject to any disclaimer, the term of this patent is extended or adjusted under 35 U.S.C. 154(b) by 554 days.

(21) Appl. No.: 11/668,768

(22) Filed: Jan. 30, 2007

(65) Prior Publication Data

US 2007/0175580 A1    Aug. 2, 2007

Related U.S. Application Data

(60) Provisional application No. 60/763,307, filed on Jan. 30, 2006.

(51) Int. Cl.
*B05B 15/00* (2006.01)

(52) U.S. Cl.
USPC ........... 239/542; 239/547; 239/562; 239/566; 239/568

(58) Field of Classification Search
USPC ............. 156/244.15, 244.11, 244.22, 244.24, 156/203, 290; 239/542, 533.1, 547, 562, 239/566, 568
See application file for complete search history.

(56) References Cited

U.S. PATENT DOCUMENTS

| 4,572,756 A | 2/1986 | Chapin |
| 4,642,152 A | 2/1987 | Chapin |
| 4,722,759 A | 2/1988 | Roberts et al. |
| 4,756,339 A | 7/1988 | Buluschek |
| 4,880,167 A | 11/1989 | Langa et al. |
| 5,022,940 A | 6/1991 | Mehoudar |
| 5,123,984 A | 6/1992 | Allport et al. |
| 5,252,162 A | 10/1993 | Delmer |
| 5,282,578 A | 2/1994 | De Frank |
| 5,282,916 A | 2/1994 | Bloom |
| 5,310,438 A | 5/1994 | Ruskin |
| 5,318,657 A | 6/1994 | Roberts |
| 5,324,371 A | 6/1994 | Mehoudar |
| 5,324,379 A | 6/1994 | Eckstein |
| 5,333,793 A | 8/1994 | De Frank |
| 5,364,032 A | 11/1994 | De Frank |
| 5,375,770 A | 12/1994 | Roberts |
| 5,387,307 A | 2/1995 | Roberts |
| 5,400,973 A | 3/1995 | Cohen |
| 5,458,712 A | 10/1995 | De Frank |
| 5,522,551 A | 6/1996 | De Frank et al. |
| 5,584,952 A | 12/1996 | Rubenstein et al. |
| 5,591,293 A | 1/1997 | Miller et al. |
| 5,615,838 A | 4/1997 | Eckstein et al. |

(Continued)

FOREIGN PATENT DOCUMENTS

WO    WO 99/02273    1/1999

OTHER PUBLICATIONS

Israeli Patent Application No. 91571, entitled "Drip Irrigation Line and Method of Making Same", filed Sep. 8, 1989.

*Primary Examiner* — Christopher Schatz
(74) *Attorney, Agent, or Firm* — IPLM Group, P.A.

(57) ABSTRACT

A self-contained flow path unit (202), (302), (400), (500) includes a continuous flow path operatively connected to a continuous strip member to form a self-contained flow path unit. The self-contained flow path unit may be accumulated for later use in forming an irrigation hose.

6 Claims, 12 Drawing Sheets

U.S. PATENT DOCUMENTS

| | | |
|---|---|---|
| 5,620,143 A | 4/1997 | Delmer et al. |
| 5,634,595 A | 6/1997 | De Frank et al. |
| 5,673,852 A | 10/1997 | Roberts |
| 5,676,897 A | 10/1997 | Dermitzakis |
| 5,695,127 A | 12/1997 | Delmer et al. |
| 5,722,601 A | 3/1998 | De Frank et al. |
| 5,732,887 A | 3/1998 | Roberts |
| 5,744,779 A | 4/1998 | Buluschek |
| 5,785,785 A | 7/1998 | Delmer et al. |
| 5,855,324 A | 1/1999 | De Frank et al. |
| 5,865,377 A | 2/1999 | De Frank et al. |
| 5,957,391 A | 9/1999 | De Frank et al. |
| 6,015,102 A | 1/2000 | Daigle et al. |
| 6,039,270 A | 3/2000 | Dermitzakis |
| 6,116,523 A | 9/2000 | Cabahug et al. |
| 6,120,634 A | 9/2000 | Harrold et al. |
| 6,371,390 B1 | 4/2002 | Cohen |
| 6,382,530 B1 * | 5/2002 | Perkins ..................... 239/542 |
| 6,561,443 B2 | 5/2003 | Delmer |
| 6,772,496 B1 | 8/2004 | Buluschek |
| 6,886,761 B2 | 5/2005 | Cohen |
| 6,945,476 B2 | 9/2005 | Giuffre |
| 2002/0113147 A1 * | 8/2002 | Huntley ..................... 239/542 |
| 2005/0258279 A1 * | 11/2005 | Harrold ..................... 239/542 |
| 2006/0043219 A1 * | 3/2006 | Raanan ..................... 239/542 |

* cited by examiner

CONTINUOUS MOLDED EMITTER

This application claims priority to U.S. Provisional Application Ser. No. 60/763,307, filed Jan. 30, 2006.

BACKGROUND OF THE INVENTION

1. Field of the Invention

This invention relates generally to irrigation hose, and more particularly to an irrigation hose having an elongate continuous molded emitter extruded on a substrate and assembled into the hose either at the factory or shipped for later assembly.

2. Description of the Prior Art

Agricultural irrigation systems in use today are predominantly flood and sprinkler systems. These systems have numerous shortcomings, including inefficient use of water and fertilizers, high labor and energy costs, pollution of surface and ground waters, and poor uniformity of water application on steep or uneven terrain.

Drip irrigation systems are being developed and adopted to address the above-noted problems. There are two major types of drip irrigation systems currently in use. The first involves use of discrete emitters installed either internally (In-Line) or externally (On-Line) to the hose. These emitters have passageways through which the water must pass, thereby regulating the water flow rate through the emitter. Such emitters may be pressure-compensating or non-pressure-compensating.

Another type of drip irrigation system employs a hose having a continuous emitter such as the Aqua-TraXX® hose of The Toro Company. Such hose includes the use of a continuous non-elastic strip which, in conjunction with the hose, forms a plurality of emitters. Perforations are then formed in the outside surface of the hose into the outlet of the emitter. During the production of such a hose, the flow path is extruded as a bead and goes to a rotary mold (two wheels) where it is formed into a flow path. The flow path then is placed in the hose as the hose is extruded. The speed at which the flow path may be extruded is limited. As higher speeds, since the flow path relies on its own structural integrity as it is coming out of the rotary mold, it cannot be extruded as fast as desired or the flow path will loose its definition and not be as effective as an emitter.

The present invention addresses the problems associated with the prior art devices and provides for an improved hose and method of making the hose utilizing a continuously molded emitter that may be assembled at the factory or shipped for later assembly.

SUMMARY OF THE INVENTION

In one embodiment the invention is a method of making a continuous self-contained flow path unit for use in making an irrigation hose at a first location. The method includes extruding a continuous flow path, the flow path having a bottom member and a plurality of features. The features are operatively connected on top of the bottom member. The features include water inlets, flow regulating members and outlets. A continuous strip member is extruded onto the features, thereby enclosing the flow path and forming a self-contained flow path unit. The self-contained flow path unit is accumulated and stored for subsequent use in forming an irrigation hose.

In another embodiment the invention is a self-contained flow path unit. The unit contains a continuous flow path. The flow path has a bottom member and a plurality of features. The features are operatively connected on top of the bottom member. The features include water inlets, flow regulating members and outlets. A continuous strip member is operatively connected to the features, thereby enclosing the flow path and forming the continuous self-contained flow path unit, whereby the continuous self-contained flow path unit is able to be accumulated for later use in forming an irrigation hose.

DETAILED DESCRIPTION OF A PREFERRED EMBODIMENT

Figure 1:
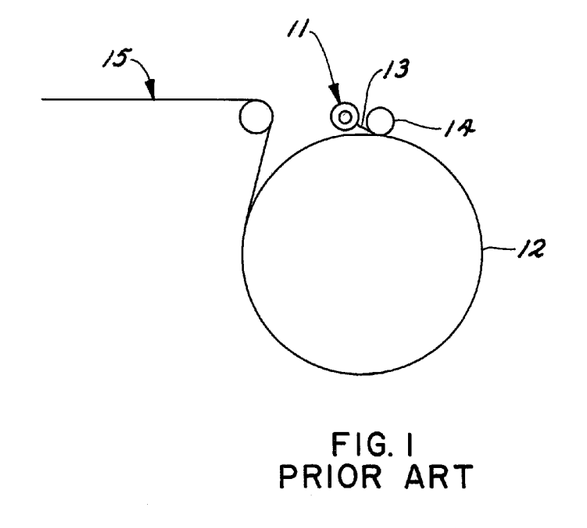
FIG. 1 is a schematic representation of the prior art.

Referring to the drawings, wherein like numerals represent like parts throughout the several views, there is generally disclosed at 10 an irrigation hose. The method of making an extruded flow path for use in an irrigation hose is shown generally in FIG. 1. There, a mold wheel extruder 11 extrudes a bead of plastic material on to a mold wheel 12. The bead of material 13 is positioned on the mold wheel 12 between the mold wheel 12 and another wheel 14. The completed flow path 15 is then formed between the wheels 12 and 14. The completed flow path 15 comes off of the mold wheel 12 and is then positioned inside of the die that is extruding the hose, thereby making an irrigation hose having a continuous flow path. The mold wheel 12 and wheel 14 form a plurality of individual emitter segments on the flow path 15, as is well known in the art. However, the flow path 15 will lose its definition if the flow path 15 is too hot and is susceptible to stretching. This constraint limits the speed at which the flow path 15 may be extruded. Existing flow paths 15 are generally extruded at an average of approximately 170 feet per minute. The flow path 15 is cooled as it moves around the mold wheel 12. The temperature at which the bead of material 13 is extruded is approximately 390 degrees F. When the completed flow path 15 comes off of the mold wheel 12, the temperature is approximately 100-140 degrees F.

Figure 2:
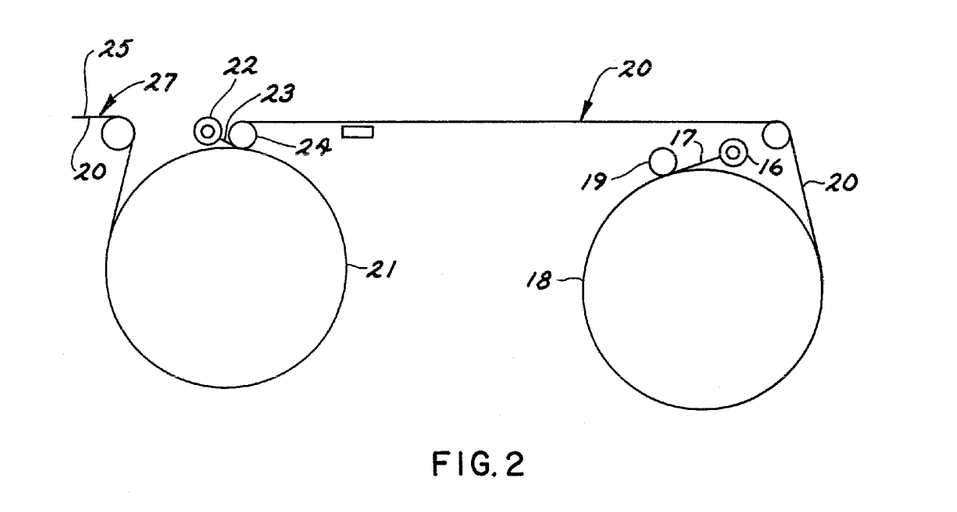
FIG. 2 is a schematic view of the present invention.
Figure 3:
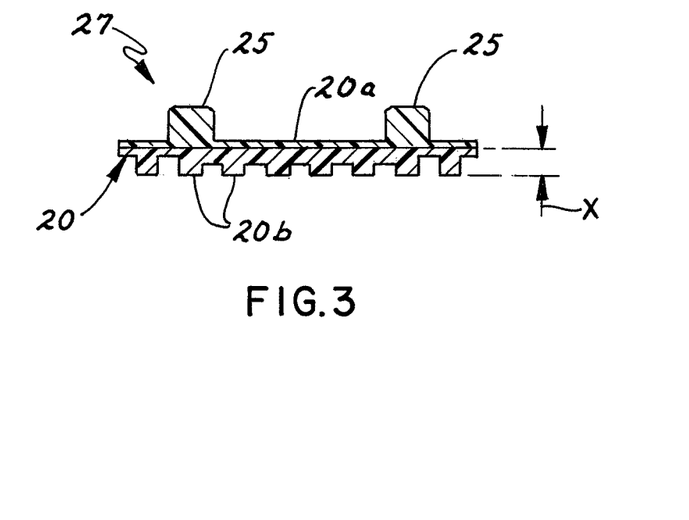
FIG. 3 is a cross-sectional view of the flow path formed in accordance with the present invention.

The irrigation hose 10 of the present invention is made in accordance with the method shown in FIG. 2. A substrate mold extruder 16 extrudes a bead of material 17 on to a substrate wheel 18. The beaded material passes between a second wheel 19 and the substrate wheel 18 and forms a substrate 20. The bead of material 20 is extruded at approximately 380° F. and is formed from a suitable material such as LLDPE. The substrate 20 will have a width which is sufficient to accommodate and support a flow path. The substrate 20 has an overall thickness of approximately 0.014 inches. This thickness is represented by X in FIG. 3. A plurality of fins 20b are formed in the substrate 20 to provide for additional heat transfer. The top surface 20a is planar and is adapted to receive the flow path, as will be described more fully hereafter. The substrate 20 is then transferred to the mold wheel 21 and the mold wheel extruder 22. The mold wheel extruder extrudes a bead of material 23 on to the top surface 20a of the substrate 20. At this point, the substrate 20 has cooled to approximately 120° F. The bead of material 23, on top of substrate 20, then passes between a second wheel 24 and the mold wheel 21. During this process, the bead of material 23 is formed into a suitable flow path 25 having a suitable configuration, as is well known in the art. The configuration would include water inlets, flow regulating members, an outlet and other suitable flow path elements. The bead of material 23 is any suitable material such as LLDPE, the same as the substrate 20. However, it is understood that other materials may also be utilized. The flow path 25 may also be of a different material than the substrate 20. By extruding the bead of material 23 on the substrate 20, it is possible to make the laminate of the continuous strip member 27, which is completed flow path 25 and substrate 20, at a speed higher than the completed flow path of the prior art. The flow path 25 is formed on a cooler substrate 20 and therefore does not have to rely on its own structural strength alone, but also can rely on the structural strength of the substrate 20, and therefore can be done at higher speeds. Line speed increases of at least 100 percent are possible using the present invention. Further, the flow path 25 is able to be molded with more definition utilizing the present invention.

Figure 4:
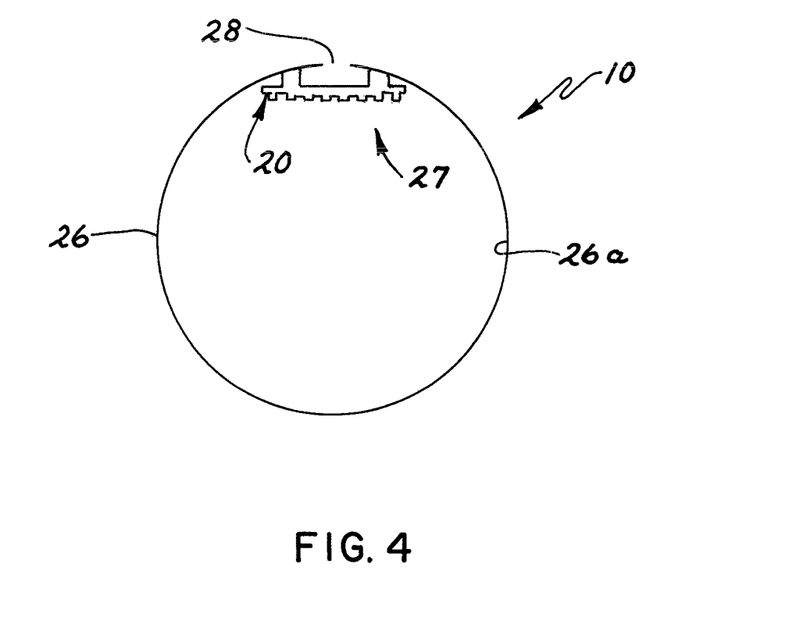
FIG. 4 is a view showing the flow path inserted in an irrigation hose.

FIG. 4 shows the lamination of the substrate 20 and flow path 25 in a hose 26, thereby forming the irrigation hose 10. The hose 26 has an inner wall 26a and forms the main water passageway through the hose 10. The continuous strip member 27 is laminated to the hose 26 in a manner similar to the known process of laminating the flow path 15 of the prior art. The continuous strip member may be rolled up and stored for later insertion into the hose 10. Alternately, the continuous strip member 27 may go right from the mold wheel 21 to the extruder for the hose. That is, the lamination of the flow path 25 and substrate 20 from the mold wheel 21 is positioned inside of the die head extruding the hose 26 thereby forming the irrigation hose 10. Suitable inlets (not shown) allow passage of water from the main water passageway into the emitter through the flow path. Suitable outlets 28 are formed in the irrigation hose 10 above the outlet section of the flow path 25, by means well known in the art.

Figure 5:
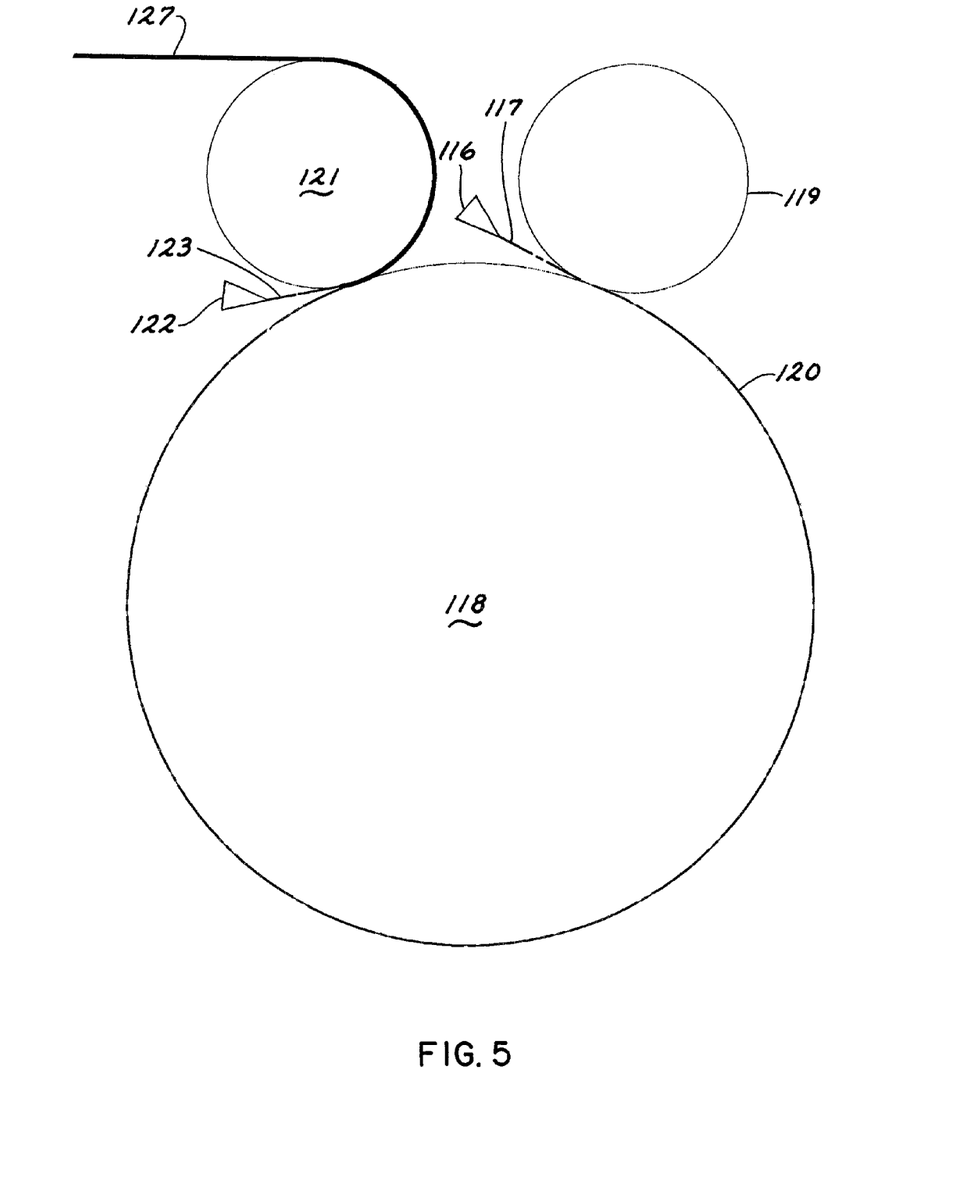
FIG. 5 is a schematic view of another method according to the present invention.

FIG. 5 is a schematic representation of another method of carrying out the present invention. A substrate mold extruder 116 extrudes a bead of material 117 on to a substrate wheel 118. The bead of material 117 passes between a second wheel 119 and the substrate wheel 118 to form a substrate 120. The bead of material 117 is extruded at approximately 380° F. and is formed from a suitable material such as LLDPE. The substrate 120 will have a width which is sufficient to accommodate and support a flow path. A substrate 120 has an overall thickness of approximately 0.014 inches. This thickness is represented by X' in FIG. 8. The top surface 120a is planar and is adapted to receive the flow path, as will be described more fully hereafter. The substrate 120 is then positioned under a second extruder 122. The second extruder 122 extrudes a bead of material 123 on to the top surface 120a of the substrate 120. At this point, the substrate 120 has cooled to approximately 120° F. The bead of material 123 on top of the substrate 120, then passes between the substrate wheel 118 and a mold wheel 121. During this process, the bead of material 123 is formed into a suitable flow path 125 having a suitable configuration, as is well known in the art, and will be described more fully with respect to FIGS. 6-8. The bead of material 123 is any suitable material such as LLDPE, the same as the substrate 120. However, it is understood that other materials may also be utilized. The flow path 125 may also be of different material than the substrate 120. By extruding the bead of material 123 on top of the substrate 120, it is possible to laminate the continuous strip member 127, which is the completed flow path 125 and substrate 120, at a speed higher than the completed flow path of the prior art. The flow path 125 is formed on the cooler substrate 120 and therefore does not have to rely on its own structural length alone, it can also rely on the structural strength of the substrate 120, and therefore can be done at higher speeds.

Figure 6:
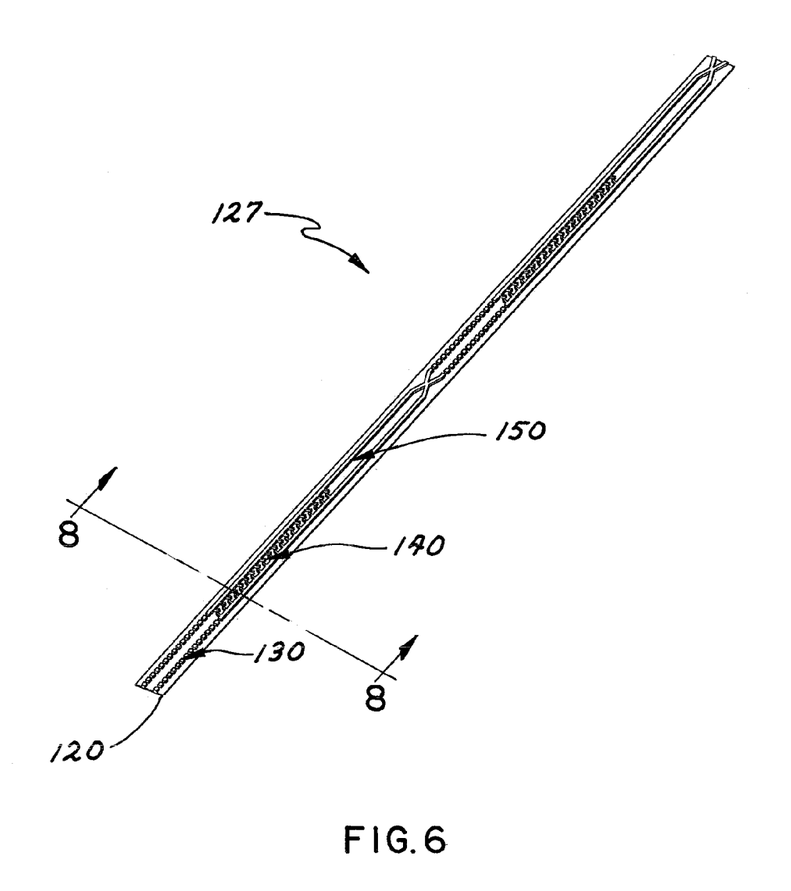
FIG. 6 is a perspective view of another embodiment of a continuous strip member.
Figure 7:
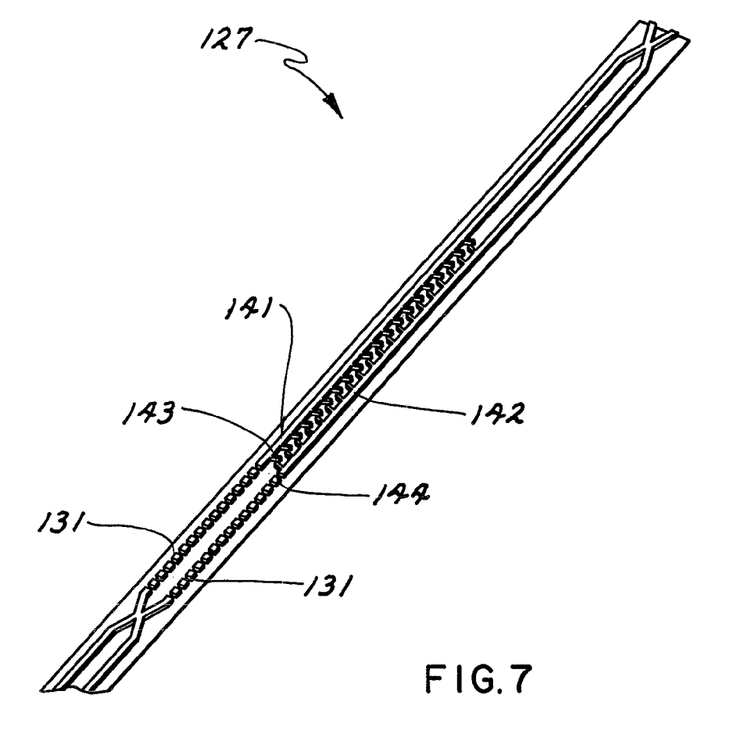
FIG. 7 is an enlarged perspective view of a portion of the continuous strip member shown in FIG. 6.
Figure 8:
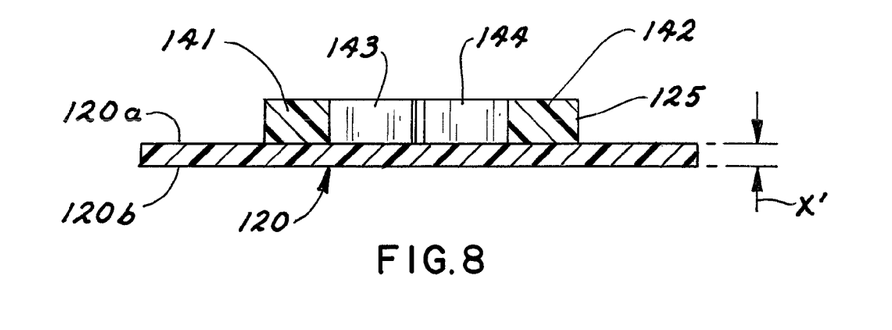
FIG. 8 is a cross-sectional view of the continuous strip member taken generally along the lines 8-8 in FIG. 6.

Referring now to FIGS. 6-8, there is shown a continuous strip member 127. The continuous strip member 127 includes the substrate 120, having a top surface 120a and a bottom surface 120b. As compared to the substrate 20, the substrate 120 does not have the fins to aid in heat transfer, although it is understood that fins or other protrusions may be formed to aid in the transfer or removal of heat. The flow path 125 is shown in more detail than the flow path 25. As compared to FIG. 3, the flow path 25 extends across the entire top surface 20a, as viewed in FIG. 3. The bottom of the flow path 125 is so thin that it is not seen in the cross section in FIG. 8. The flow path 125 has an inlet section generally designated at 130, a flow regulator section generally designated at 140 and an outlet chamber generally designated at 150. The inlet section 130 includes a plurality of rectangular members 131 which allows water to enter from the interior of the hose 10 into the emitter unit of the continuous strip member 127. FIG. 6 shows two emitter units, while the enlargement in FIG. 7 shows only one. A pair of side members 141, 142 extend the length of the emitter unit and are generally in alignment with the rectangular members 131. The continuous strip member 127, when it is operatively connected to the inner wall 26a, is secured along the side members 141, 142 and the rectangular members 131. The flow regulating section 140 has two sets of chevrons 143, 144 that provide a tortuous path through which the water flows. The water then flows into the outlet chamber 150. An aperture 28 is formed in the hose 10 above the outlet chamber 150 to allow for water to exit the continuous strip member 127. The openings 28 are spaced along the length of the hose 10 above the outlet chambers 150 in the continuous strip emitter 127.

As previously described, after the continuous strip member 127 has been formed, it can be transported directly to another extruder that is extruding the hose 26. The continuous strip member 127 would be inside of the die of the extruder forming the hose. The continuous strip member is able to be formed at a higher speed, as previously indicated, thereby allowing for greater efficiencies.

In addition, another option is to accumulate, by rolling up or other suitable means, the continuous strip member 127 after it is formed. This allows for the later forming of the hose 10 or alternately shipping the continuous strip member 127 to other locations where the hose 10 may be completed. This allows for the high value or high tech portion of the hose 10, namely the continuous strip member 127, to be shipped at a much lower cost than the entire hose. Therefore, since the shipping of hose is an expensive portion of the overall costs, it is only necessary to have a facility that can extrude the hose at other locations throughout the country or the world and the continuous strip members 127 may be supplied from more central locations.

Figure 9:
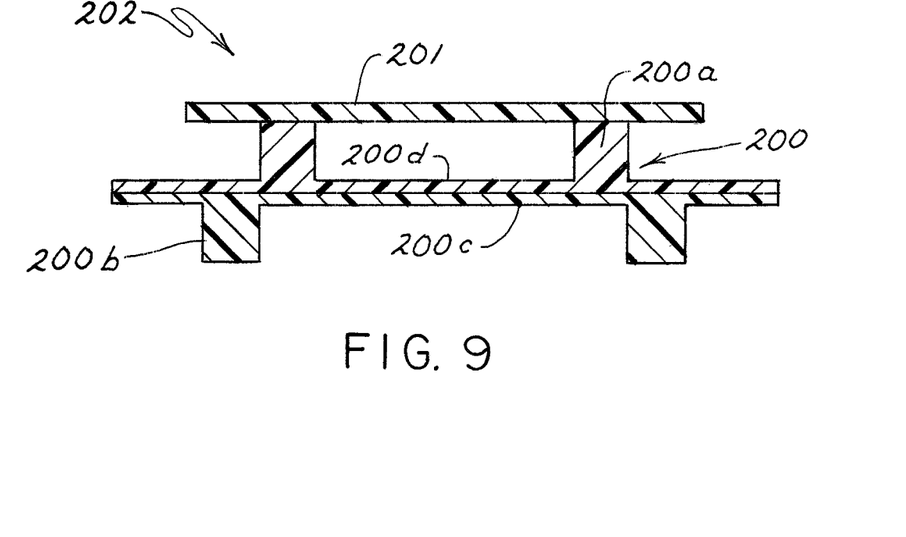
FIG. 9 is a cross-sectional view of another embodiment of a continuous flow path.

Referring now to FIG. 9, there is shown a continuous strip member 200 operatively connected to a ribbon 201 to form a self-contained flow path unit 202. The self-contained flow path unit 202 is constructed from three separate layers, a ribbon 201 a flow path 200*a* and a layer 202*c* with fins 200*b*. The strip member 200 is formed similar to continuous strip member 27. The continuous strip member 200 includes a flow path 200*a*, having a bottom member 200*d*, formed from a first bead of extruded material, (similar to flow path 25) and the layer 200*c* with fins 200*b*, formed from a second bead of material, (similar to fins 20*b*). Typically the layer 200*c* with fins 200*b* is formed first and allowed to cool, as described in the prior embodiments, so that the flow path 200*a* may be extruded onto the layer 200*c* faster and with more defined features. Then a third bead of material is extruded and formed into a ribbon 201 and comes in contact and encapsulates the flow path 200*a*. However, it is recognized other orders may also be used. The ribbon 201 operatively encloses the flow path 200*a* of the continuous strip member 200. The third bead of material is extruded and passed under a forming wheel to form the ribbon 201. The continuous strip member 200, which previously has been formed by combining the flow path 200*a* and fins 200*b*, is then brought in contact with the ribbon 201, while it is still hot, to thereby operatively connect the ribbon 201 to the continuous strip member 200 to form the flow path unit 202. Alternately, the ribbon 201 could be extruded first and then the flow path unit. If the ribbon 201 is constructed from an elastomeric material different from the continuous strip member 200, the flow path unit 202 is a pressure compensating emitter. One example would be where the continuous strip member 200 is made from a suitable material such as LLDPE and the ribbon 201 is constructed from a thermoplastic elastomer. The ribbon 201 has an elastic response that is greater than the elastic response of the continuous strip 200. Preferably the elastic response is at least twice as great for the ribbon 201. The flow path unit 202 is therefore composed of two materials where the first is a conventional thermoplastic and the second exhibits a strong elastomeric response. The ability of the latter to stretch and then retract is important for the flow path 202 to be pressure compensating. In one example, the ribbon 201 could have a thickness of from 0.005 inch to 0.020 inch and preferably 0.010 inch. This would allow for pressure compensation when the flow path unit 202 is inserted in a hose, similar to FIG. 4. In this particular instance the fins 200*b* would be operatively connected to the hose.

Figure 10:
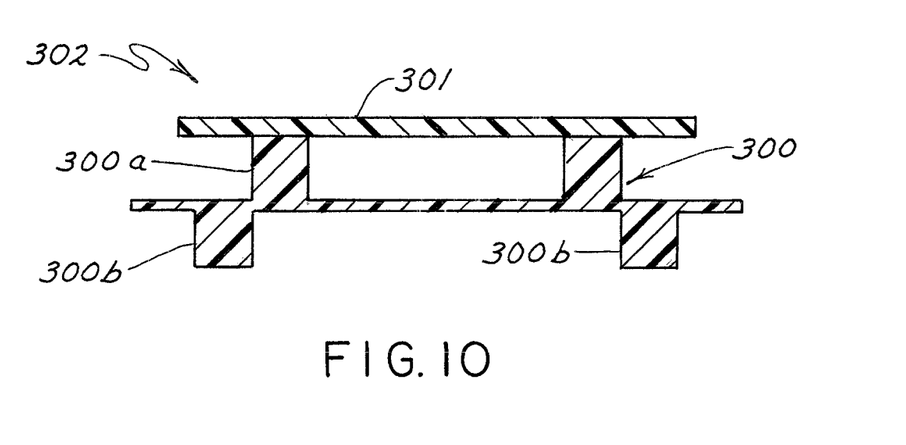
FIG. 10 is a cross-sectional view of another embodiment of a continuous flow path.

Referring now to FIG. 10, another continuous strip member 300, having a two-piece design, is shown. The continuous strip member 300 has a ribbon 301 operatively connected thereto to form a continuous self-contained flow path unit 302. The continuous strip member 300 is a one-piece design, as opposed to the two-piece design shown in FIG. 9. To make such a continuous strip member 300, a bead of material is extruded and is passed between two opposing forming wheels. The first forming wheel would create the flow path 300*a* and the second forming wheel would form the fins 300*b*. The ribbon 301 then is operatively connected, similar to ribbon 201. Again, the ribbon 301 may be extruded before or after the flow path. If the ribbon 301 is constructed from an elastomeric material different from the continuous strip member 300, the flow path unit 302 is a pressure compensating emitter. One example would be where the continuous strip member 300 is made from a suitable material such as LLDPE and the ribbon 301 is constructed from a thermoplastic elastomer. The ribbon 301 has an elastic response that is greater than the elastic response of the continuous strip 300. Preferably the elastic response is at least twice as great for the ribbon 301. The flow path unit 302 is therefore composed of two materials where the first is a conventional thermoplastic and the second exhibits a strong elastomeric response. The ability of the latter to stretch and then retract is important for the flow path unit 302 to be pressure compensating. In one example, the ribbon 301 could have a thickness of from 0.005 inch to 0.020 inch and preferably 0.010 inch. This would allow for pressure compensation when the flow path unit 302 is inserted in a hose, similar to FIG. 4. In this particular instance the fins 300*b* would be operatively connected to the hose.

Similar to the other strip members 27, 127, the flow path units 202 and 302 may then be transported directly to another extruder that is extruding the hose 26. The flow path units 202, 302 would be inside of the die head of an extruder forming the hose. The flow path units 202, 302 are able to be formed at higher speeds, as previously indicated, thereby allowing for greater efficiencies.

Further, similar to continuous strip members 27, 127, the flow path units 202 and 302 may be accumulated, by rolling up or other suitable means. This allows for the later forming of the hose 10 or alternately shipping the flow path unit 202, 302 at a much slower cost than the entire hose. Further, the flow path units 202, 302 are complete or self-contained. That is, the flow path is encapsulated so that when the flow path units 202, 302 are inserted and assembled into the hose 10, there are not the quality control issues of maintaining the tolerances of the flow path as the flow paths are already formed and are in a cool/solid condition when being assembled inside of the hose 10. The self-contained flow paths do not use the hose for a portion of its flow path.

Figure 11:
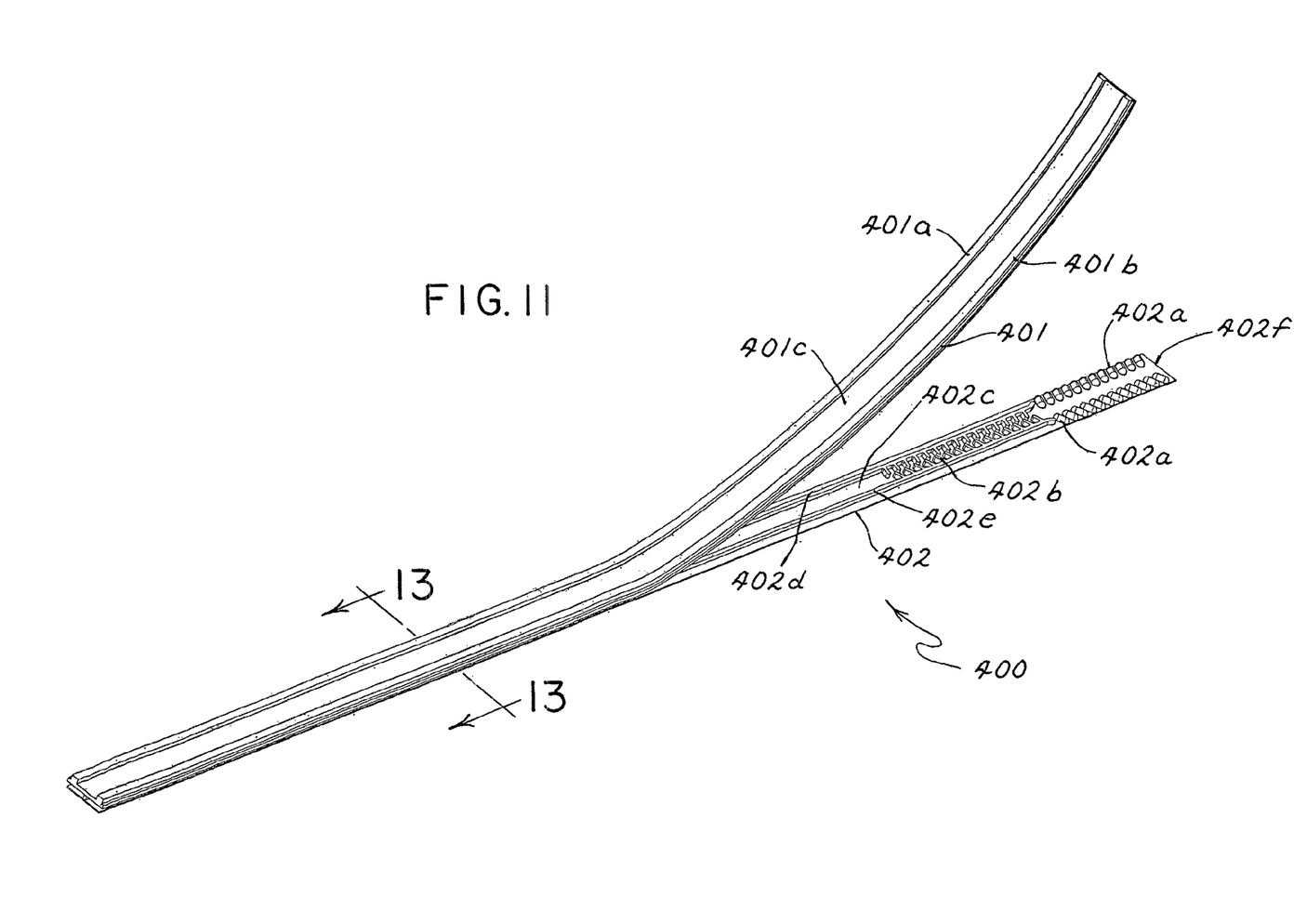
FIG. 11 is a perspective view of another embodiment of a continuous flow path.
Figure 13:
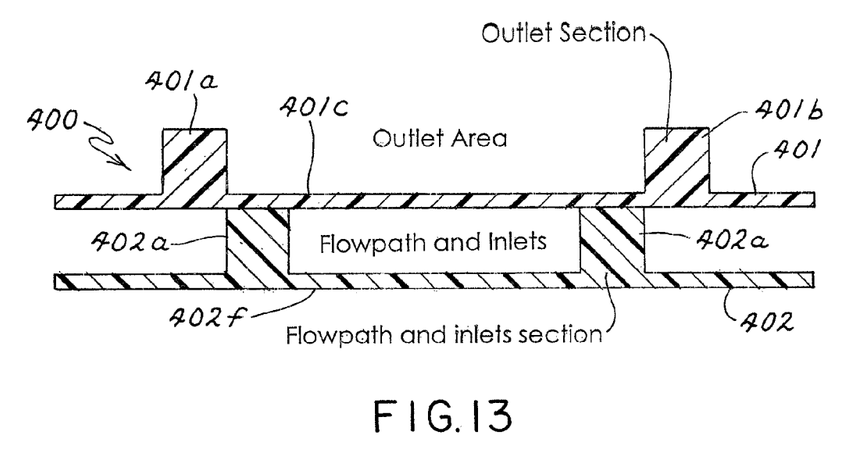
FIG. 13 is a cross-sectional view of the flow path shown in FIG. 11, taken generally along the lines 13-13.

Referring now to FIGS. 11 and 13, there is shown another embodiment of a self-contained flow path unit, designated as 400. The self-contained flow path unit 400 includes a ribbon or continuous strip member 401 operatively connected to a flow path 402. The ribbon 401 is formed by having a bead of material extruded and formed by a suitable forming wheel. The ribbon 401 has two generally rectangular raised members 401*a* and 401*b* that are formed on a generally planar section 401*c*. The area between the raised members 401*a* and 401*b* forms an outlet area or section. Apertures (not shown) are formed in the planar section 401*c* above the outlet of the flow path 402, as will be described more fully hereafter. As previously discussed with respect to the other flow paths of the previous embodiment, the flow path 402 is formed similar to the flow path 120. The flow path 402 has a number of features formed therein to form an emitter unit. A plurality of generally angled rectangular members or chevrons 402a are formed and create an inlet. Members 402b are formed that create a flow resistance within the emitter unit formed. Finally, an outlet 402c is formed at the end of the flow path members 402b. The apertures that are not shown in the planar section 401c would be above the outlet 402c. Raised rectangular members 402d and 402e are formed along the sides and further define the outlet 402c. The features described 402a-402e are formed on the top surface of the bottom member 402f of the flow path 402.

Figure 12:
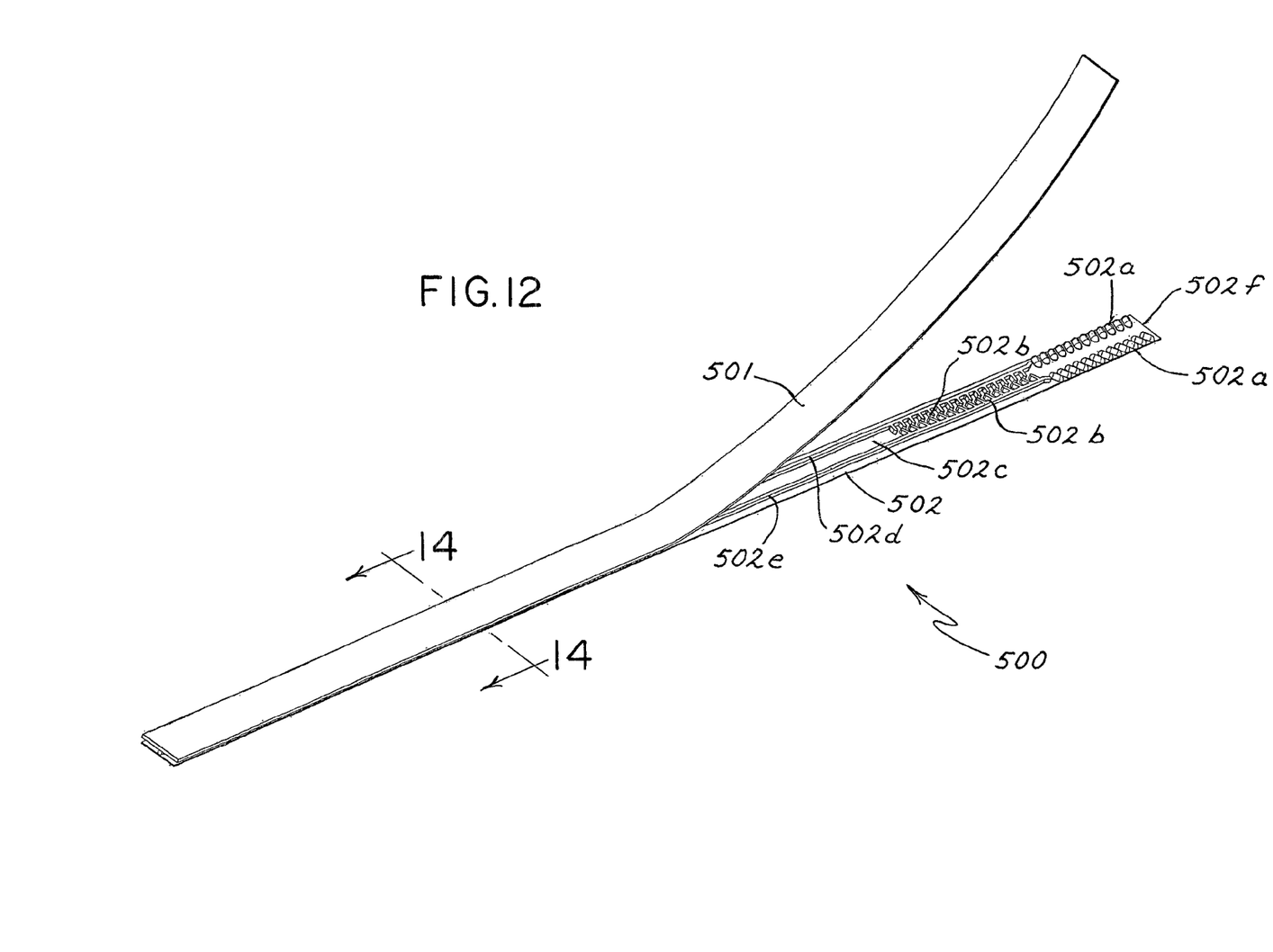
FIG. 12 is a perspective view of still another embodiment of a continuous flow path.
Figure 14:
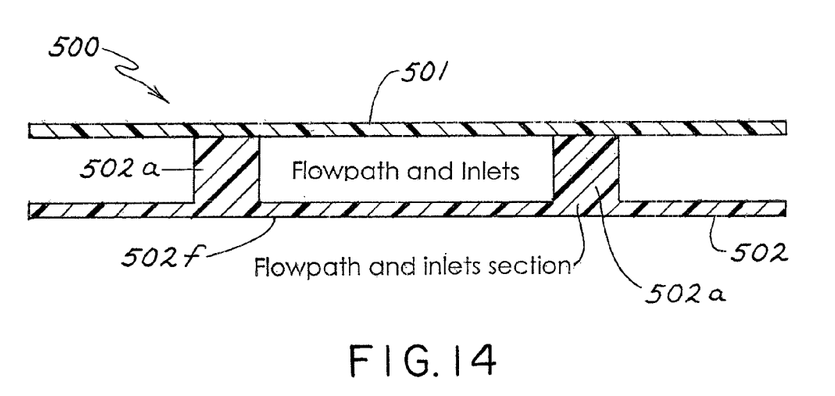
FIG. 14 is a cross-sectional view of the flow path shown in FIG. 12, taken generally along the lines 14-14.

Referring now to FIGS. 12 and 14, there is shown another embodiment of a self-contained flow path unit, designated as 500. The self-contained flow path unit 500 includes a ribbon or continuous strip member 501 operatively connected to a flow path 502. The ribbon 501 is formed by having a bead of material extruded and formed by a suitable forming wheel. The ribbon 501 is generally planar. Apertures (not shown) are formed in the ribbon 501 above the outlet of the flow path 502, as will be described more fully hereafter. As previously discussed with respect to the other flow paths of the previous embodiment, the flow path 502 is formed similar to the flow path 120. The flow path 502 has a number of features formed therein to form an emitter unit. A plurality of generally angled rectangular members or chevrons 502a are formed and create an inlet. Members 502b are formed that create a flow resistance within the emitter unit formed. Finally, an outlet 502c is formed at the end of the flow path members 502b. The apertures that are not shown in the ribbon 501 would be above the outlet 502c. Raised rectangular members 502d and 502e are formed along the sides. The features described 502a-502e are formed on the top surface of the bottom member of the flow path 502.

Figures 15, 16, 17:
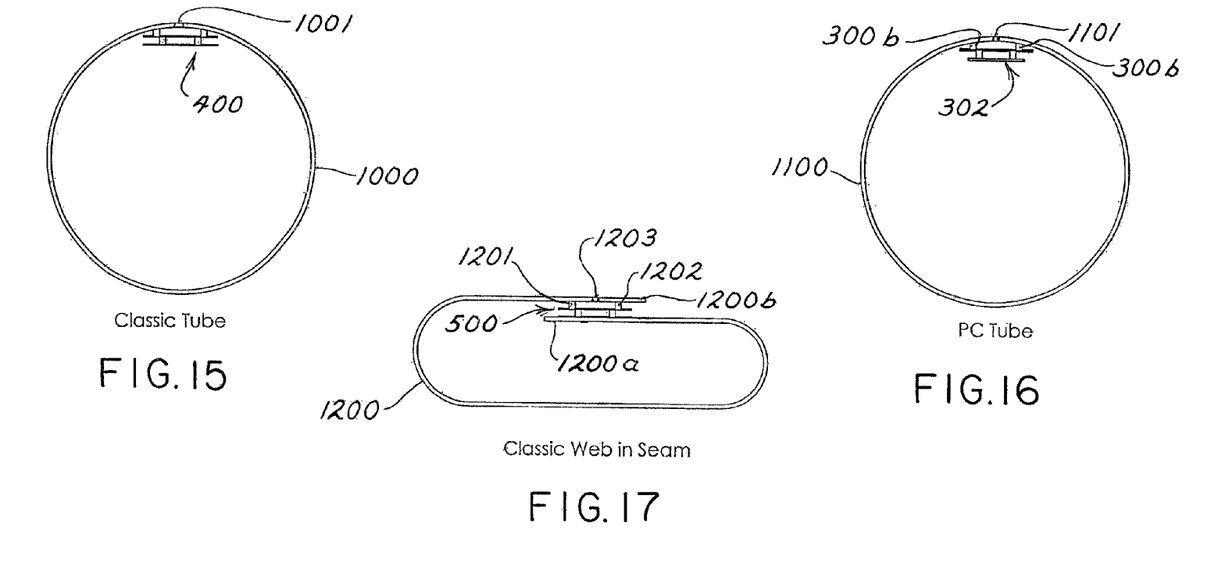
FIG. 15 is an end view of a hose incorporating the flow path shown in FIG. 13.
FIG. 16 is an end view of a hose incorporating the flow path shown in FIG. 14.
FIG. 17 is an end view of a hose incorporating the flow path shown in FIG. 14.
Figure 18:
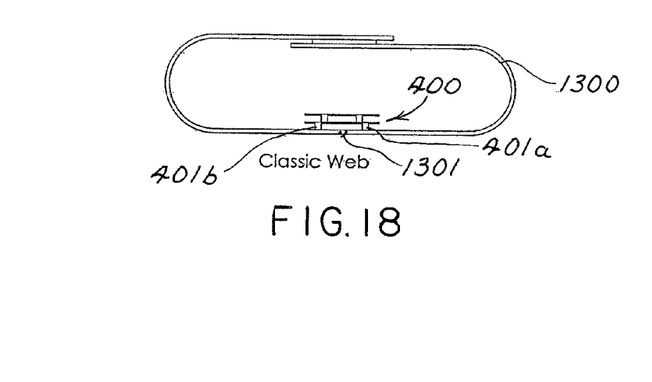
FIG. 18 is an end view of a hose incorporating the flow path shown in FIG. 13.
Figure 19:
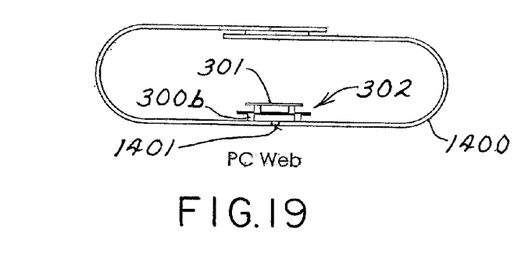
FIG. 19 is an end view of a hose incorporating a flow path shown in FIG. 10.

Referring now to FIGS. 15-20, there are shown several examples of hoses that have been constructed utilizing the self-contained flow path units 202, 302, 400 and 500. It is recognized that many other permutions and combinations may also be used. Generally, two examples in FIGS. 15 and 16 are shown utilizing self-contained flow path units 400 and 500 respectively into a classic hose. In both instances, the hose 1000, 1100, may be extruded along with the self-contained flow path units 400, 500 or alternately the flow path units 400, 500 may be assembled first for later insertion into the hose as the hose 100, 110 is being made at a different location or at least at a different time. In FIG. 15, it is seen that the self-contained flow path unit 400 is secured to the hose 1000 by raised members 401a and 401b as the hose 1000 is extruded. An opening 1001 is formed in the hose 1000 at appropriate intervals above the outlet area of the self-contained flow path unit 400. In FIG. 16, the self-contained flow path unit 302 is shown operatively connected to the hose 1100. The fins 300b are secured to the hose 1100 as the hose is being extruded. An opening 1101 is formed in the hose 1100 above the outlet area of the self-contained flow path unit 302. The tube construction in FIGS. 15 and 16 have a circular hose being extruded through a die, by means well known in the art. FIGS. 17-19 show the use of the self-contained flow path units in a web. A web is generally a flat rectangular strip of plastic that is folded over upon itself to form a hose. Construction of such a web is well known in the art.

Figure 20:
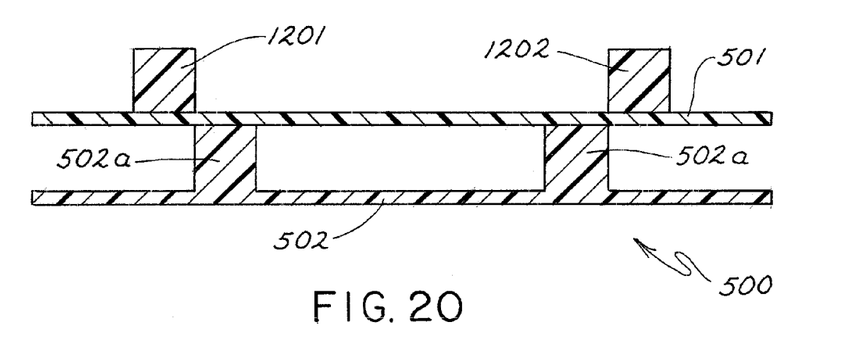
FIG. 20 is cross-sectional view of the flow path shown in FIG. 14 showing added features during the assembly as shown in FIG. 17.

Referring now to FIGS. 17-19, FIG. 17 shows a continuous flow path unit 500, as shown in FIG. 14, assembled into a web 1200. The flow path 502 is secured, by suitable means well known in the art to one end 1200a of the web 1200, such as by hot-melt glue or welding. Then, as shown in FIG. 20, two additional features 1201 and 1202 are placed on top of the ribbon 501. The features 1201 and 1202 may be a suitable hot-melt glue and are adhered to both the ribbon 501 and the second end 1200b of the web 1200. The features 1201, 1202 provide a distance between the web 1200 and the ribbon 501. This provides for an outlet area. An opening 1203 is formed in the web on top of this outlet area and provides for an exit for the water to move from the inside of the web to the outside.

FIG. 18 shows the continuous flow path unit 400 assembled in a web 1300. The raised members 401a and 401b are secured to the web 1300 by suitable means such as hot-melt glue or welding and the web 1300 is secured to itself as previously discussed. An opening 1301 is formed in the web 1300 over the outlet area of the continuous flow path unit 400.

FIG. 19 shows the continuous flow path unit 302 assembled in a web 1400. The fins 300b are secured to the web 1400 by suitable means such as hot-melt glue or welding and the web 1400 is secured to itself as previously discussed. An opening 1401 is formed in the web 1400 over the outlet area of the continuous flow path unit 302. As can be seen, the differences between FIGS. 18 and 19 is the difference in using a pressure compensating self-contained flow path unit 302 as opposed to a non-pressure compensating continuous flow path unit 400.

Figure 21:
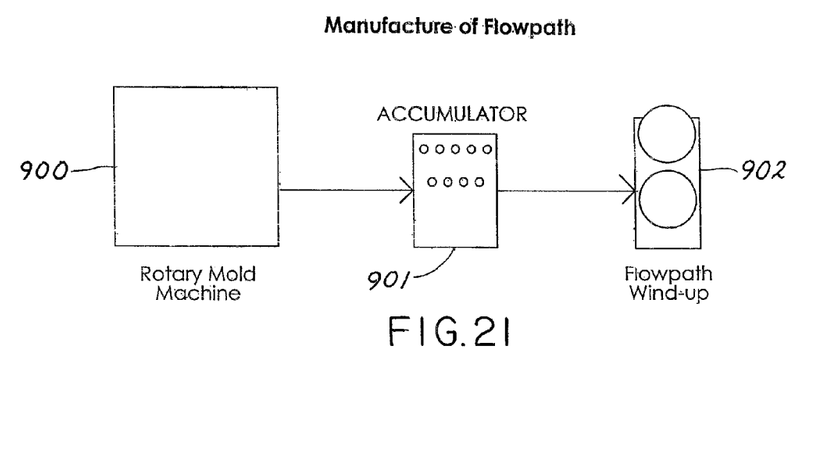
FIG. 21 is a schematic view of a flow path of the manufacturing of a continuous flow path.

FIG. 21 shows generally a flow schematic of the manufacturer of a continuous strip or flow path as previously described. The rotary molding machine 900 will take multiple material streams and mold them into the various sections of the flow path, as previously described. The flow path may contain 1, 2 or 3 pieces containing inlets, flow regulating features, an outlet chamber and pressure responsive features, in the case of pressure compensating models. The flow path will leave the rotary mold machine 900 at a constant speed and go into an accumulator 901. The accumulator 901 is used to maintain constant tension on the flow path and also to give input to the windup speed regulation. The flow path windup 902 will reel the flow path into a package on a reel that is made from cardboard, plastic or wood. The completed reel of flow paths will then be stored for future use, or shipped to another factory at the same or at a different location for use in the manufacturing of an irrigation hose.

Figure 22:
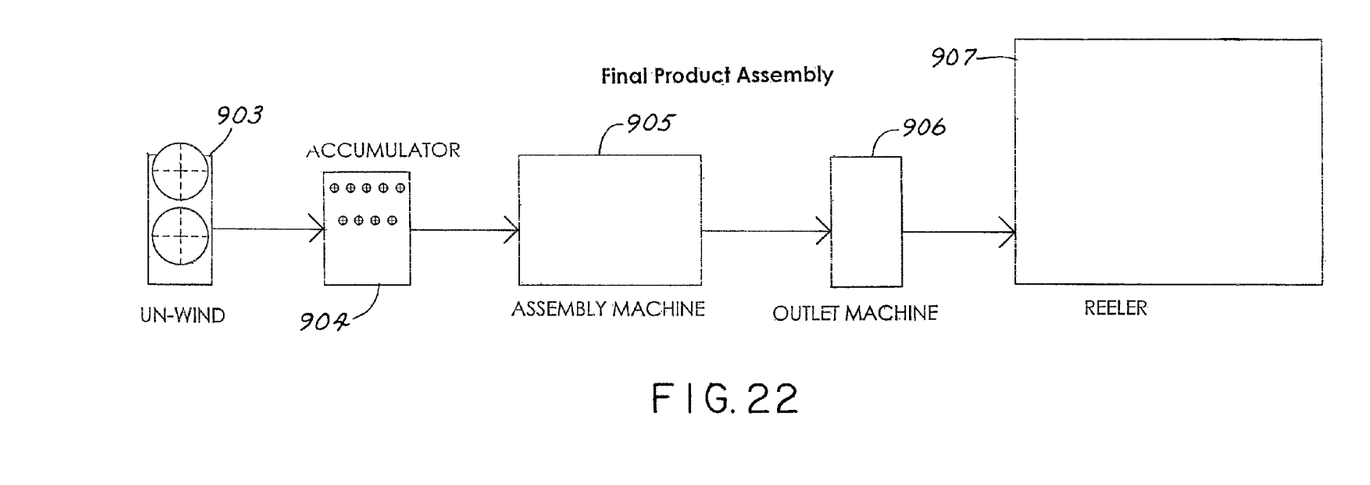
FIG. 22 is a schematic view of the assembly of a hose according to the present invention.

Referring now to FIG. 22, there is schematically shown the final product assembly. A reel of the flow path, as accumulated in FIG. 21, will be loaded onto an unwind device 903. The unwind device 903 is used to remove the flow path from the packaging reel. The flow path will move through an accumulator 904. The accumulator 904 maintains constant tension on the flow path and gives input to the unwind device's 903 speed regulation control. The accumulator 904 also stores a sufficient amount of flow paths so that when one reel of the flow path is consumed, another can be loaded into the unwind device 903 and the flow path can be spliced to the end of the flow path in the accumulator 904. By having enough of the flow path in the accumulator 904, the need to load a new reel of flow path does not cause the assembly process to be interrupted.

An assembly machine 905 joins the flow path into a tube or web, as previously described, in order to make the irrigation hose or drip tape. The assembly machine 905 may be an extrusion line wherein the flow path would be inserted and adhered into the tube as it is being extruded. The assembly machine 905 could also be designed to take a piece of flat plastic strip from a reel similar to the flow path. The flow path would then be joined to the flat plastic strip by using hot melt glue, or other suitable methods such as welding by ultrasonic, laser or heat. The flat plastic strip would then be rolled and seamed into a tubular form. An outlet machine 906 is responsible for making an outlet in the hose or drip tape for water to drip from. The outlet machine 906 may use lasers, knives, saws, punches or drills to make an outlet. The completed irrigation hose, whether a hose or a web, then goes to a reeler 907. The reeler 907 winds the product into packaging reels for distribution to customers.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A continuous self-contained flow path unit and hose combination forming a continuous molded emitter, comprising:
   (a) a hose having a wall with an inner surface and an outer surface;
   (b) a continuous flow path, the flow path having a bottom member and a plurality of features, the features operatively connected on top of the bottom member, the feature including water inlets, flow regulating members and outlets;
   (c) a continuous strip member operatively connected to the features, thereby enclosing the flow path and forming the continuous self-contained flow path unit; and
   (d) a raised member, formed separately from the flow path, operatively connected to the continuous strip member and positioned between the continuous strip member and the inner surface of the hose wall, said raised member extending the entire length of the continuous strip member, wherein when the continuous strip member is connected to the inner surface of the hose wall, the continuous strip member and the entire flow path are spaced from the inner surface of the hose wall.

2. The continuous self-contained flow path unit and hose combination of claim 1, further comprising the continuous strip member being formed from a first elastomeric material that is softer than a second elastomeric material used for the continuous flow path.

3. The continuous self-contained flow path unit and hose combination of claim 1, further comprising:
   (a) a substrate; and
   (b) the bottom member of the continuous flow path operatively connected to the substrate.

4. The continuous self-contained flow path unit and hose combination of claim 1, further comprising a second raised member, the raised members being spaced and generally parallel to each other.

5. The continuous self-contained flow path unit and hose combination of claim 1, wherein the raised member is from a hot-melt glue.

6. The continuous self-contained flow path unit and hose combination of claim 1, wherein the raised member is integral with the continuous strip member.

* * * * *